US009000379B2

United States Patent
Simonetti et al.

(10) Patent No.: US 9,000,379 B2
(45) Date of Patent: Apr. 7, 2015

(54) SCINTILLATOR CRYSTAL MATERIALS, SCINTILLATORS AND SUBTERRANEAN DETECTORS

(75) Inventors: John J. Simonetti, Hamilton, NJ (US);
Donna Simonetti, Hamilton, NJ (US);
Albert Hort, Mount Laurel, NJ (US);
Christian Stoller, Princeton Junction, NJ (US)

(73) Assignee: Schlumberger Technology Corporation, Sugar Land, TX (US)

( * ) Notice: Subject to any disclaimer, the term of this patent is extended or adjusted under 35 U.S.C. 154(b) by 617 days.

(21) Appl. No.: 13/320,680

(22) PCT Filed: May 20, 2010

(86) PCT No.: PCT/US2010/035511
§ 371 (c)(1),
(2), (4) Date: May 1, 2012

(87) PCT Pub. No.: WO2010/135489
PCT Pub. Date: Nov. 25, 2010

(65) Prior Publication Data
US 2013/0075617 A1 Mar. 28, 2013

Related U.S. Application Data

(60) Provisional application No. 61/179,892, filed on May 20, 2009.

(51) Int. Cl.
*G01T 1/20* (2006.01)
*C09K 11/02* (2006.01)
(Continued)

(52) U.S. Cl.
CPC .............. *C09K 11/025* (2013.01); *C09K 11/772* (2013.01); *G21K 4/00* (2013.01); *G01T 1/2006* (2013.01); *G01T 1/202* (2013.01); *G21K 2004/06* (2013.01)

(58) Field of Classification Search
USPC ...................................... 250/361 R
See application file for complete search history.

(56) References Cited

U.S. PATENT DOCUMENTS 4,158,773 A * 6/1979 Novak ............... 250/361 R
4,313,257 A   2/1982 Woodbury et al.
(Continued)

FOREIGN PATENT DOCUMENTS

JP    H06082561 A    3/1994
WO    0181905 A2    11/2001

OTHER PUBLICATIONS

International Preliminary Report on Patentability dated Dec. 1. 2011 for corresponding PCT Application No. PCT/US2010/035511.
(Continued)

*Primary Examiner* — Christine Sung
(74) *Attorney, Agent, or Firm* — Cathy Hewitt

(57) ABSTRACT

Methods for pre-treating packaging materials of particular composition for use in conjunction with a scintillation crystal are disclosed. The packaging materials may comprise a reflecting material, an elastomer, a reflecting fluorocarbon polymer, a polymer or elastomer loaded with a reflecting inorganic powder (including a reflecting inorganic powder comprising a high reflectance material selected from the group comprising $Al_2O_3$, $TiO_2$, BN, MgO, $BaSO_4$ and mixtures thereof), or a highly reflective metal foil selected from the group comprising Ag and Al that is chemically compatible with the scintillator crystal. The scintillator crystal may comprise a crystal selected from the group comprising NaI(Tl), $LaBr_3$:Ce, La—$Cl_3$:Ce, La-halides, and La-mixed halides. The method includes subjecting a scintillator packaging material to a pre-treatment while in package form, said treatment selected from the group consisting of heating to a temperature exceeding a proposed operating temperature of the scintillator package, and placing the packaging material under pressure in a confined space until the packaging material is in final form.

31 Claims, 4 Drawing Sheets

(51) Int. Cl.
   *C09K 11/77* (2006.01)
   *G21K 4/00* (2006.01)
   *G01T 1/202* (2006.01)

(56) References Cited

U.S. PATENT DOCUMENTS

| | | | |
|---|---|---|---|
| 4,360,733 | A | 11/1982 | Novak et al. |
| 4,764,677 | A | 8/1988 | Spurney |
| 4,900,937 | A | 2/1990 | Dayton et al. |
| 4,994,673 | A | 2/1991 | Perna et al. |
| 5,283,439 | A * | 2/1994 | Bouissou et al. ............. 250/368 |
| 5,548,116 | A | 8/1996 | Pandelisev |
| 5,742,057 | A | 4/1998 | Frederick et al. |
| 6,433,340 | B1 | 8/2002 | Penn |
| 2008/0121817 | A1 | 5/2008 | Becker et al. |
| 2010/0032577 | A1 * | 2/2010 | Fruehauf et al. ............. 250/368 |

OTHER PUBLICATIONS

Notification of Reasons for Refusal for Japanese Application No. 2012-512015 dated Jun. 11, 2014.

Extended European Search Report for EP Application No. 10778360.7 dated Jan. 29, 2015.

* cited by examiner

SCINTILLATOR CRYSTAL MATERIALS, SCINTILLATORS AND SUBTERRANEAN DETECTORS

RELATED APPLICATIONS

The present application claims priority to U.S. Provisional Patent Application Ser. No. 61/179,892 filed May 20, 2009.

BACKGROUND

A typical scintillator crystal package 100 is assembled from the individual parts shown in FIG. 1. A scintillator crystal 102 is wrapped or otherwise surrounded by one or more layers of a preferably diffuse reflective sheet that is preferably formed from a fluorocarbon polymer. The wrapped crystal 102 can be inserted in a hermetically sealed housing 104 which may already have the optical window 106 attached. The window 106 may be sapphire or glass, as noted in U.S. Pat. No. 4,360,733. The housing 104 may then be filled with a silicone (RTV) that fills the space 114 between the crystal 102 and the inside diameter of the housing 104. Optical contact between the scintillator crystal 102 and the window 106 of the housing 104 is established using an internal optical coupling pad 108 comprising a transparent silicone rubber disk.

Alternatively, the scintillator may be surrounded by a reflecting powder that is chemically and mechanically compatible with the scintillator material. Such powders could be $Al_2O_3$, $TiO_2$, $BaSO_4$ or similar materials. The powders can be packaged directly around the scintillator crystal 102 or be supported in a reflecting or transparent elastomer. With proper surface preparation, metallic reflectors such as Ag can be used as well, if they are chemically inert in the presence of the scintillator material.

An end cap is sealed over the open end to complete the scintillator package 100 and prevent exposure of the scintillator crystal 102 to air that would degrade performance. An internal spring 110 pushing against the scintillator 102 through a pressure plate 116 may be included to provide axial force on the scintillator crystal 102 to insure that optical contact is maintained. These general processes are known to those familiar with the art, as described in U.S. Pat. No. 4,764,677.

DETAILED DESCRIPTION

In the following description, numerous details are set forth to provide an understanding of the present disclosure. However, it will be understood by those skilled in the art that the present invention may be practiced without these details and that numerous variations or modifications from the described embodiments are possible.

Figure 1:
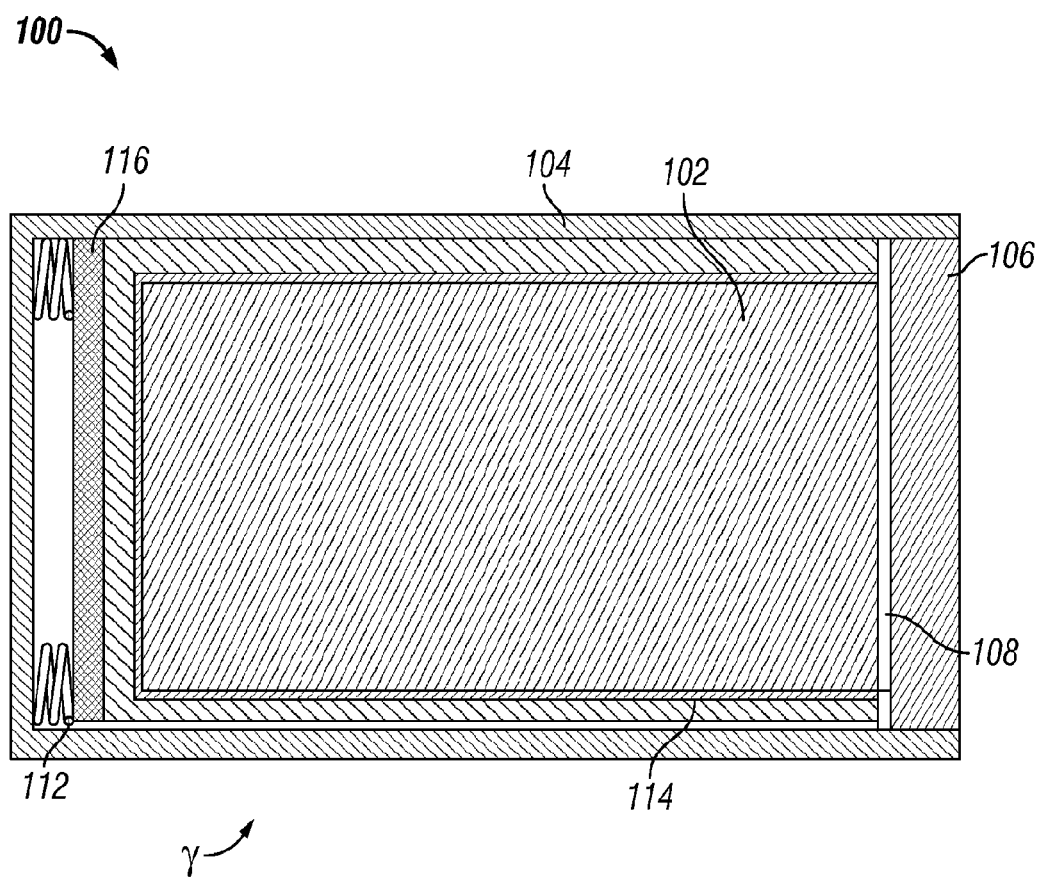
FIG. 1 is a diagram of a hermetically packaged scintillator.
Figure 2:
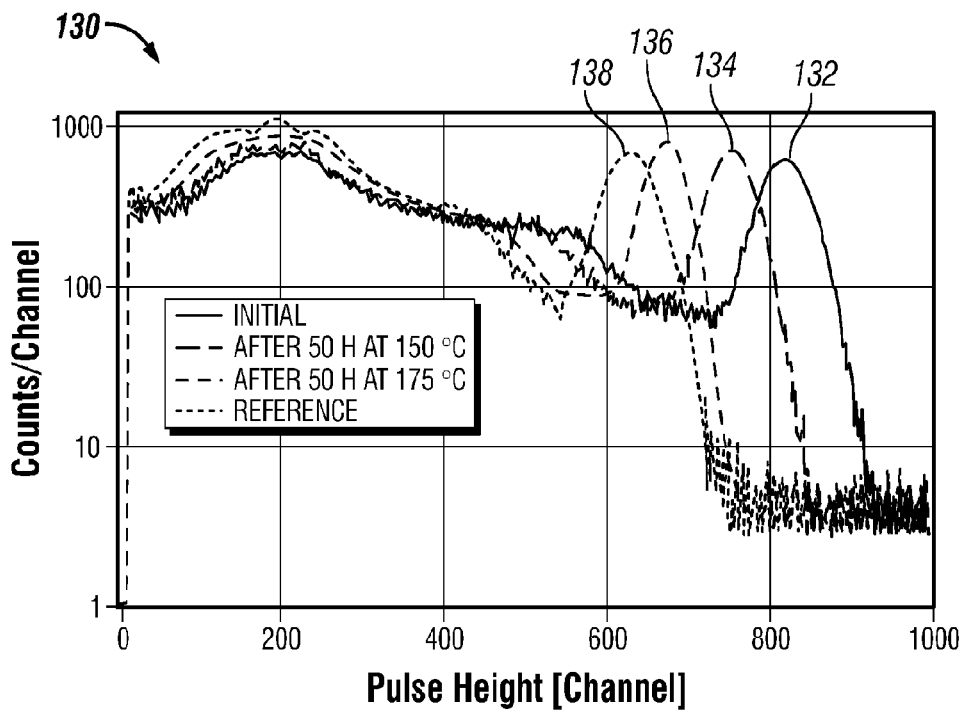
FIG. 2 is a graph showing $^{137}Cs$ spectra of a scintillator crystal before and after heating.

We have identified a flaw in sealed packages (as described above with respect to FIG. 1): heating the sealed package to high temperature results in degraded performance that can be substantial and unpredictable. The typical degradation can be quantified by measuring a gamma ray spectrum using a standard photomultiplier connected to a multichannel analyzer. The package can be measured at room temperature after exposure to specific time and temperature heating cycles. The $^{137}Cs$ spectra resulting from multiple such cycles are shown in FIG. 2. Each cycle results in a reduction in light output which represents diminished performance.

The thermally induced degradation identified above could be attributed to outgassing from the reflective and elastic materials that surround the crystal. The vapor phase compounds released may interact with the air sensitive scintillator or condense to form a layer with reduced reflectivity on or in the reflecting material to cause this degradation. We disclose here methods to minimize the effects of outgassing by carefully selecting the materials used inside the package and individually pretreating the materials with a high temperature bake in vacuum or inert gas prior to applying them to the scintillator crystal. Silicone elastomers may be vacuum baked at about 200° C. for at least 12 hours or alternately baked at least to 200° C. in vacuum, $N_2$ or inert gas. The pure dry $N_2$ supply is preferably from the boil off of a liquid $N_2$ supply. The inert gas may consist of any noble gas such as He, Ne, Ar, Xe or other nonreactive gas including $CO_2$. The purpose of the vacuum or gas atmosphere is to remove the low molecular weight impurities. The temperature used for baking the part should be at least as high if not slightly higher than the maximum expected operating temperature of the packaged scintillator assembly. For a 200° C. scintillator, the preferred baking temperature could be at or about 225° C., if such temperature is compatible with the material being heated.

The following describes the presently disclosed methods applied to the packaging of NaI(Tl), which is the preferred embodiment. However, the present disclosure applies to any scintillator crystal packaging that is hermetically packaged and ultimately to reflectorizing and packaging of any scintillators, including those that are not air-sensitive.

The scintillator crystal itself (in the present disclosure, NaI(Tl)) is also stabilized before packaging by annealing at high temperature in an inert gas or a controlled reactive atmosphere. The scintillator crystal can be heated in an ultra high purity inert gas to at least 200° C. A vacuum atmosphere can also be used in which air has essentially been excluded. Best results may be obtained by taking care to avoid heating or cooling rates that exceed 5° C./min depending on the material and crystal size.

Alternately, the scintillator crystal can be heated in a flowing stream of a reactive gas. For best results, the reactive gas should be free of oxygen and water vapor. The reactive gas may contain some amount of HI, $I_2$ or a halogenated organic compound like $CH_3I$, $CH_2I_2$, $CHI_3$, $Cl_4$ or other appropriate halocarbon that may be carried over the crystal surface by an inert medium. This process can be carried out at room temperature but a higher temperature of at least 200° C. is preferred.

Degradation may still take place even if the components are pre-treated separately as described herein, including independent heating of the scintillator, reflective wrapping, optical coupling and shock mounting materials. The degradation is easily observed by making direct pulse height measurements using a packaged NaI/Tl scintillator. A $^{137}$Cs spectrum can be collected using a standard laboratory PMT connected to a multichannel analyzer. This standard laboratory system can also be calibrated using a packaged reference scintillator that is not heated so that it remains stable over time. The prototype package can then be exposed to temperature excursions and returned to room temperature to measure the effect of the temperature induced performance change. In such testing, the same prototype package was initially heated to 150° C. for 50 hours then to 175° C. for an additional 50 hours. The results are shown in FIG. 2, revealing that moderate thermal testing resulted in a total decrease in relative light output of 23% even though the internal parts had been heated prior to the assembly of the sealed package. The horizontal axis in the graph 130 represents the light output from the scintillator package 100. The curve 132 represents the initial performance at room temperature. After heating to 150° C. for 50 hours the spectrum 134 is obtained with the scintillator back at room temperature. Further heating to 175° C. for an additional 50 hours results in the spectrum 136. The reference spectrum 138 was taken before and after the measurements with a reference crystal that was not heated to test the stability of the system.

If, however, the parts are assembled and then baked in a confined space that simulates the tubular housing, additional degradation can be limited after the housing is sealed. The confined bake need not include the scintillator crystal. It is possible to bake the materials assembled around a cylindrical part having the same dimensions as the scintillator crystal. The cylindrical crystal form may be manufactured from a metal such as aluminum alloy, a high temperature polymer like TEFLON™, or even glass. It is likely that this confined bake stabilizes the material by allowing the internal packaging materials to equilibrate with not only the applied temperature but also with the pressure developed from thermal expansion of the materials around the scintillator crystal material while constrained by the outer housing. The effects of temperature and pressure will likely result in material changes in the package materials, in a complex way, which cannot be duplicated outside the package environment.

Possible explanations for the material changes might include the cold flow of the fluoropolymers diffuse reflective wrapping. Cold flow takes place in many fluoropolymers at room temperature when pressure is applied. Cold flow can be mitigated to some extent by using inorganic fillers, but the most common filler would result in degraded optical properties. It is possible that the use of unconventional fillers could actually boost reflective performance. These unconventional fillers may include MgO, $Al_2O_3$, $TiO_2$, BN, and $BaSO_4$ fillers, but generally fluoropolymers with these fillers are not commercially available.

Cold flow can be accelerated if the temperature is raised. Polymer properties are also a function of their crystalline content, which can be modified by both heat and pressure. Formation of an ordered phase in polymers can have dramatic effect on both optical and mechanical properties. A stable crystalline content can be achieved by aging under the actual conditions in which the polymer will be used.

Another possible effect that could be at work in the confines of a package is compression set. When a polymer with elastic properties is compressed for a period of time, it will tend to recover only a fraction of its original shape when the compression force is released. This is true for all plastics, and the amount of relaxation is a function of the amount of compression and the temperature. The preferred way to duplicate the conditions is to expose the elastomer parts to the package environment prior to sealing.

The experimental method on which these observations are based will be described here. A scintillator package was assembled using carefully prepared materials. The housing materials were carefully cleaned and the internal materials along with the housing were baked in dry $N_2$ at 200° C. The scintillator crystal was also annealed and a thin surface layer was removed by light abrasion to provide a clean surface free of superficial contamination. The scintillator crystal was then baked at 200° C. in a UHP Ar-gas. The individual parts were assembled into the housing and the housing was hermetically sealed by means of fusion welding.

Figure 3:
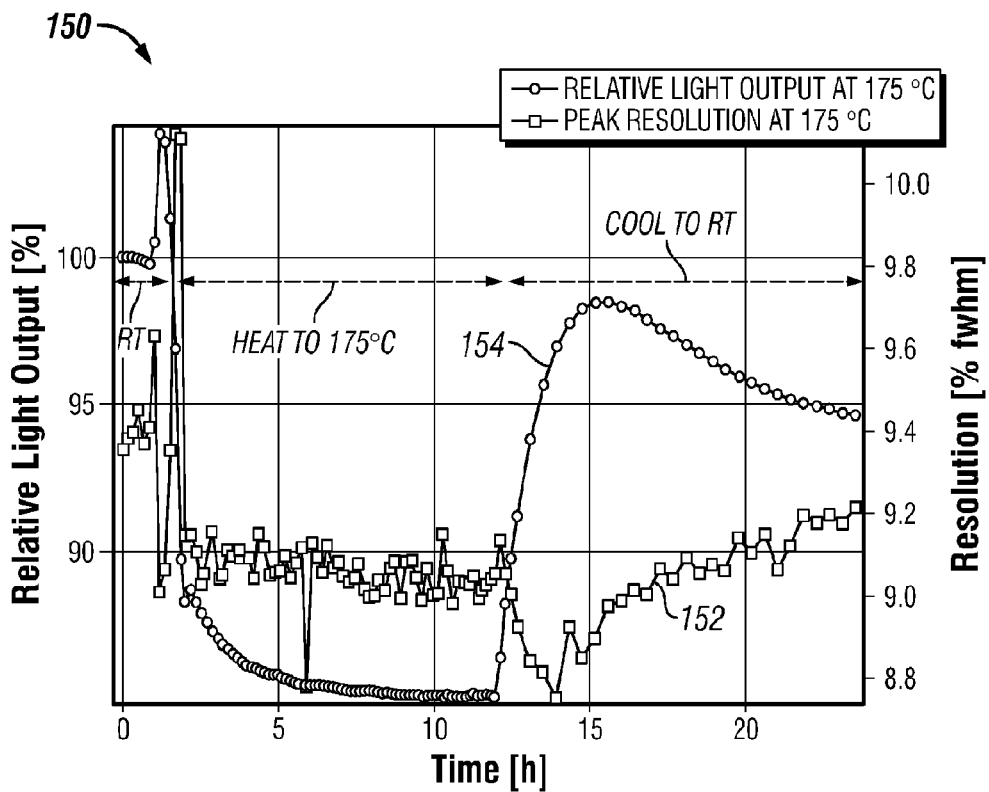
FIG. 3 is a graph showing initial $^{137}Cs$ spectrum of a scintillator crystal package of the invention.

The assembled scintillator package was placed in optical contact with a photomultiplier (PMT) maintained at room temperature. The scintillator package was thermally isolated from the PMT so that the scintillator package could be heated while maintaining the PMT at ambient temperature. A low activity $^{137}$Cs source was used to excite scintillation pulses that can be used to reconstruct a nuclear spectrum showing the number of counts per unit energy. This nuclear spectrum can be directly applied to calculate the effective light output of the scintillator package as a function of time at temperature. This is shown in the graph 150 in FIG. 3 in the Relative Light Output 154 curve (circles). The light output is calculated by measuring the position of the $^{137}$Cs photoelectric peak at 662 keV.

Initial heating shows a drop in light output as indicated by the change in relative peak position from the initial reference value at 100% to a value of about 85%. Much of this initial decrease is a result of the intrinsic temperature dependent properties of the Thallium doped Sodium Iodide scintillator crystal. This temperature dependent change is reversible. On cooling, the light output increases as the crystal package slowly returns to room temperature. The curve 154 (squares) shows the time evolution of the photopeak resolution over the same time period. The plot shows that there is a permanent loss in light yield of about 6% after heating for only a few hours. This can be put in perspective by considering that the prior methods/designs allowed for a change of 3% after a 50 hour bake at 200° C.

Figure 4:
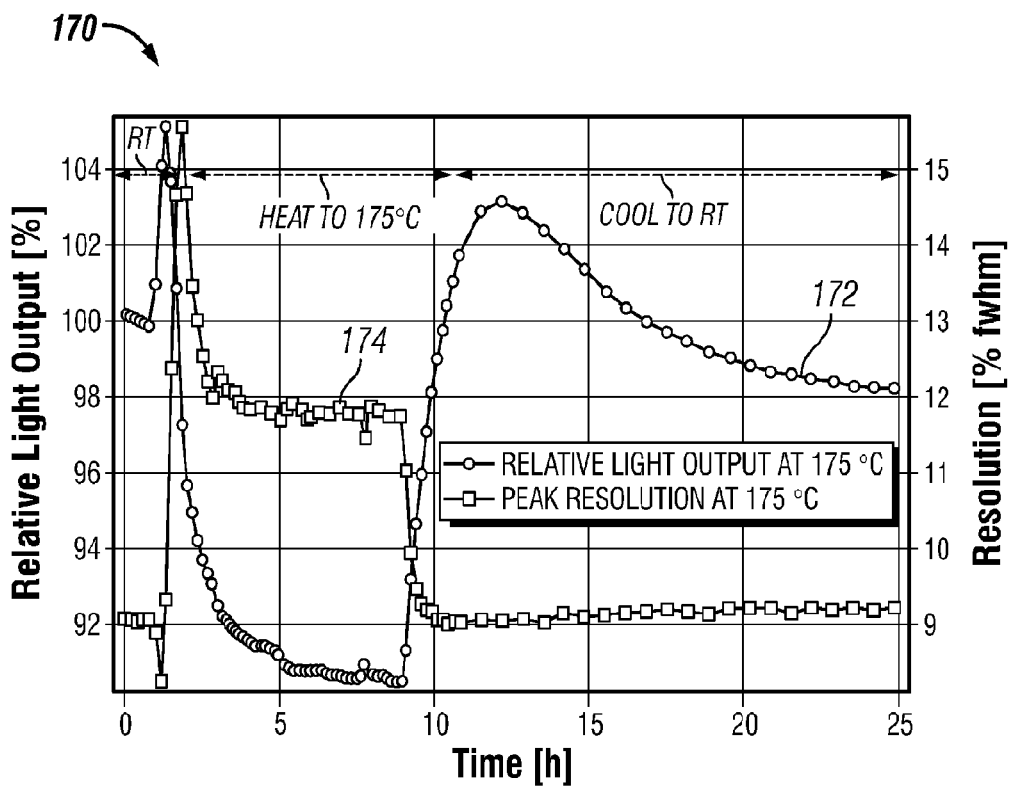
FIG. 4 is a graph showing $^{137}Cs$ spectrum of a new package tested at 175° C. with transplanted subassembly.

During testing of the initial package, damage resulted to the window assembly. The package was disassembled in an effort to understand what had caused the damage and also to recover the undamaged components. It was found possible to extract the entire crystal subassembly, which was then loaded into a new housing. The new housing was sealed and tested as before. The results are shown in graph 170 in FIG. 4.

Figure 5:
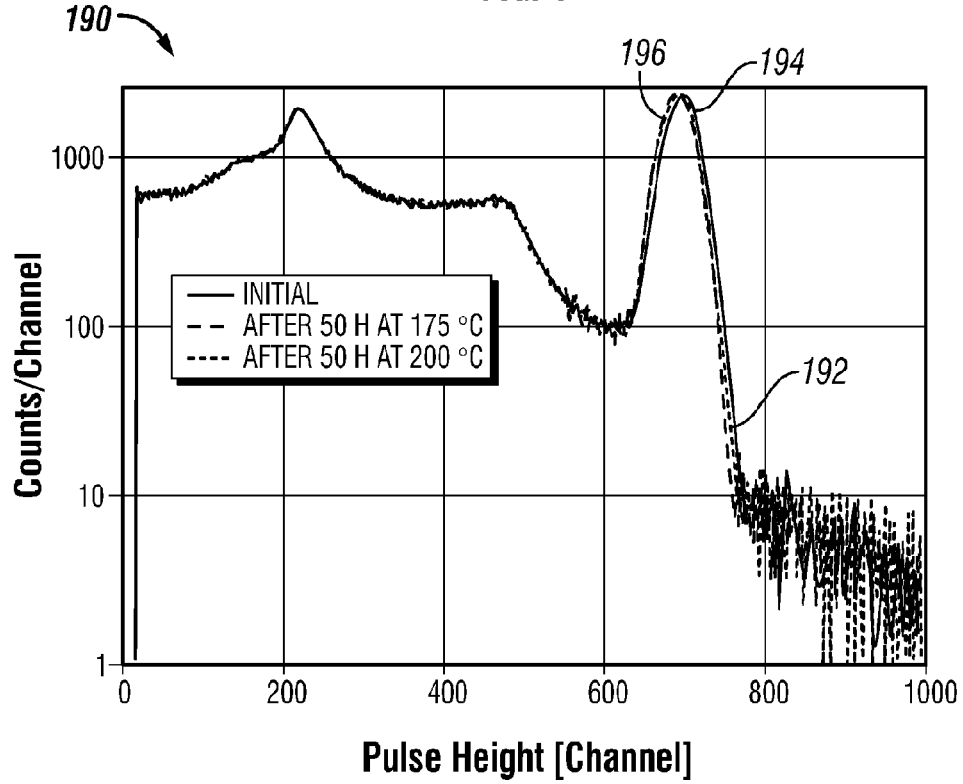
FIG. 5 is a graph showing $^{137}Cs$ Spectrum from new package with pressure treated internal assembly after successive heating to 175° C. and 200° C.

The initial expected drop in light yield 154 is about the same as before but stabilizes after only about 4 hours after reaching 175° C. Upon cooling recovery is 98% of the initial value and resolution 152 is essentially identical. The same package was successively heated to 175° C. and 200° C. for a soak time of 50 hours at each temperature. No change in light yield was detected as shown in graph 190 in FIG. 5, which shows the initial spectrum (192), the virtually indistinguishable spectrum 194 after 50 h at 175° C. and the possibly slightly shifted spectrum 196 after an additional 50 h at 200° C.

According to our disclosure, proper heat and pressure treating of the materials used in the construction of a sealed scintillator are effective steps in assuring stable performance at elevated temperatures. The pressure treatment may result in a loss of performance of the reflecting material, which is at least in part due to cold flow of the material. This leads to a smoother surface and reduced diffuse reflectivity. Diffuse reflectivity can be enhanced by wrapping or otherwise mounting the reflecting material around a mechanical core with the same dimensions as the crystal. The surface of the mechanical core can be made rough, so that the reflecting material retains or develops a surface roughness conducive to good diffuse reflectivity as it cold flows on the core.

Figure 6:
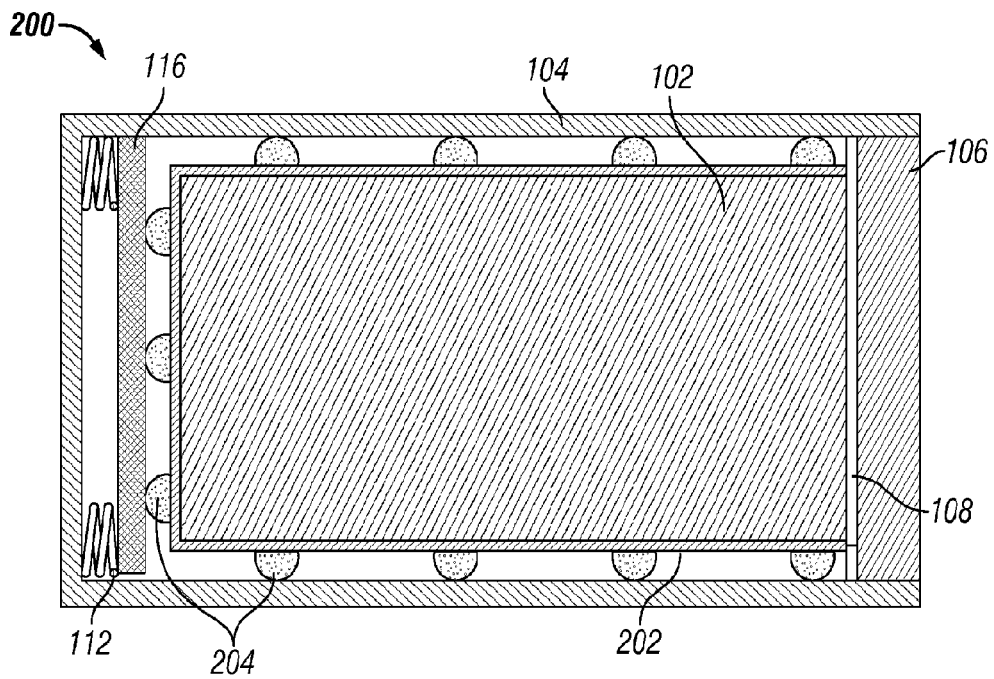
FIG. 6 is a diagram of a scintillator package with ribs to avoid pressure over a large fraction of the reflector.

Since the cold flow of the material and its better conformance to the scintillator surface reduces the reflectivity, it is possible to reduce this effect by not applying pressure equally over the entire surface of the crystal. Ribs can be used separated by spaces over which there is no compressive force on the reflecting material. An example is shown in FIG. 6. The scintillator 102 is surrounded by the reflector 202 and the assembly is held in place inside the housing 104 by the ribs 204.

Figure 7:
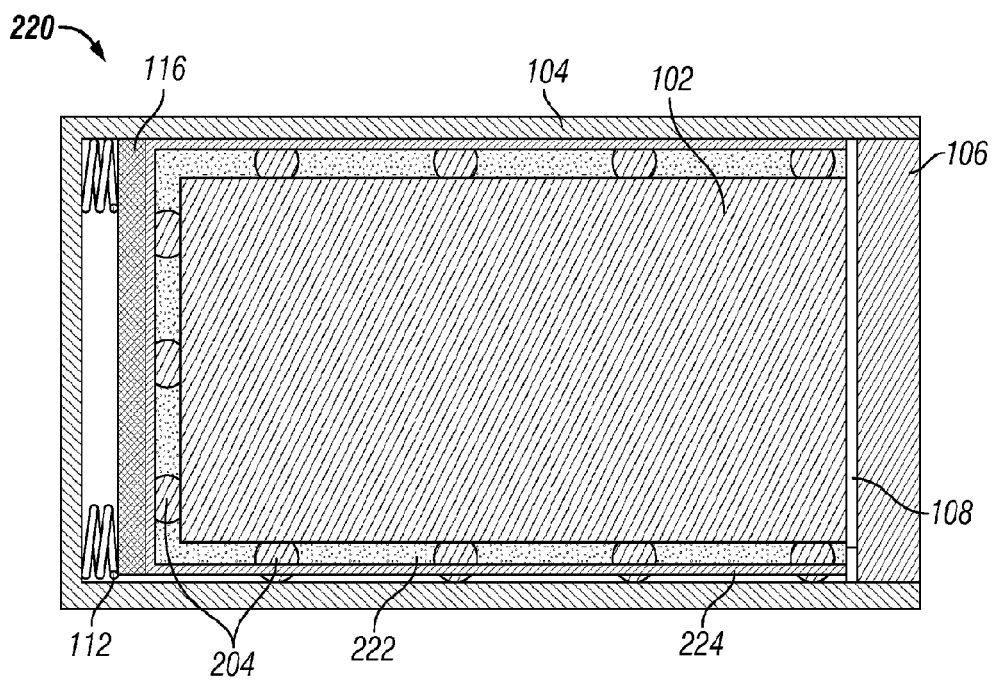
FIG. 7 is a diagram of a scintillator package with ribs touching the surface of the scintillator directly, where the space between the ribs is filled with a reflecting material.

Alternatively, the scintillator may be held by a protrusion, such as the ribs shown in FIG. 7. The (reflecting) ribs 204 or protrusions touch the scintillator directly and space between them is filled with a reflecting powder 223. The ribs are held in place by an outer sleeve 224, which may be made of the same material as the ribs. The ribs contain the powder and reduce the possibility that the powder moves and compacts under shock and vibration. The considerations described here also apply to scintillator packages that are mounted directly on to the PMT window without the intermediary of a package window. The package can be integrated with the PMT or other suitable photodetection device in the same sealed envelope and still be subject to the considerations discussed here.

The scintillator packages described above are suitable for use at high temperatures and in an environment with large mechanical stresses. Scintillator packages can be combined with a suitable photodetection device to form a radiation detector. The photodetection devices can be a photomultiplier, position sensitive photomultipliers, photodiodes, avalanche photodiodes, photomultipliers based on microchannel plates (MCPs) for multiplication and a photocathode for the conversion of the photon pulse into an electron pulse.

A typical scintillation detector comprises a PMT (photomultiplier) and a scintillation crystal. The scintillation detector is coupled to the entrance window of the photomultiplier by an optical coupling layer to optimize the transmission of the light from the scintillator package to the PMT. It should be noted that it is also possible to mount a scintillator directly to the PMT with only a single optical coupling and making the combination of PMT and scintillator into a single hermetically sealed package.

Given their properties, such detectors are well suited for use in downhole applications for the detection of gamma-rays in many of the instruments known in the art. The tools in which the detectors are used can be conveyed by any means of conveyance in the borehole.

While oilfield applications are of particular interest, scintillator packages and scintillation detectors of the invention may be used in any field or industry where usage of such types of crystals and devices are known, including but not limited to chemistry, physics, space exploration, nuclear medicine, energy industry use, including oilfield use, devices determination of weights and measurements in any industry, and the like, without limitation.

The invention has been disclosed with respect to a use with hygroscopic scintillators, in particular NaI(Tl). However the methods described, apply also to the construction of high temperature stable packaging for non-hygroscopic scintillators such as LuAP:Ce, LuYAP:Ce, LuAG:Pr, GSO:Ce and LPS.

Additionally, while the invention has been disclosed with respect to a limited number of embodiments, those skilled in the art, having the benefit of this disclosure, will appreciate numerous modifications and variations therefrom. It is intended that the appended claims cover such modifications and variations as fall within the true spirit and scope of the invention.

What is claimed is:

1. A scintillator package for enclosing a scintillator crystal, comprising:
   a scintillator crystal; and
   packaging material subjected to a pre-treatment while in package form before the scintillator crystal is installed, such that, when the scintillator crystal is installed in the packaging material, the scintillator package has a final form that does not include a particular structure detrimental to operation of the scintillator package that would otherwise be formed by an interaction between the packaging material and the scintillator crystal were the scintillator installed in the packaging materials while the treatment of the packaging materials was performed, the treatment comprising:
      heating the packaging material to a temperature exceeding a proposed operating temperature of the scintillator package before the scintillator crystal has been installed into the packaging material; or
      placing the packaging material under pressure in a confined space until the packaging material is in final form before the scintillator crystal has been installed into the packaging material; or
      a combination thereof.

2. The scintillator package according to claim 1, wherein both treatments are applied to the packaging material, performed either sequentially or simultaneously.

3. The scintillator package according to claim 1, wherein the scintillator crystal comprises a scintillator crystal sensitive to humidity in air.

4. The scintillator package according to claim 3, wherein the scintillator crystal comprises a crystal comprising NaI (Tl), LaBr3:Ce, LaCh:Ce, Ce-halides, La-halides, or La-mixed halides, or any combination thereof.

5. The scintillator package according to claim 1, wherein the treatment comprising heating to the temperature exceeding the proposed operating temperature of the scintillator package comprises heating the package form in an inert atmosphere.

6. The scintillator package according to claim 5, wherein the packaging material comprises a reflecting material secured in place by one or more protrusions from the packaging material so as to limit pressure exposure to a limited surface area of the reflecting material.

7. The scintillator package according to claim 5, wherein the packaging material comprises a reflecting material secured in place by one or more protrusions from the packaging material, said protrusions contact the scintillator directly and where space occurring between the protrusions is substantially filled with a highly reflecting material.

8. The scintillator package according to claim 1, wherein the packaging material comprises a reflecting material.

9. The scintillator package according to claim 8, wherein the reflecting material comprises an elastomer.

10. The scintillator package according to claim 8, wherein the reflecting material comprises a reflecting fluorocarbon polymer.

11. The scintillator package according to claim 8, wherein the reflecting material comprises polymer or elastomer loaded with a reflecting inorganic powder.

12. The scintillator package according to claim 11, wherein the reflecting inorganic powder comprises a high reflectance oxide.

13. The scintillator package according to claim 11, wherein the high reflectance powder comprises Ah03, TiO2, BN, MgO, BaSO4, or any mixture thereof.

14. The scintillator package according to claim 8, wherein the reflecting material comprises a highly reflective metal foil chemically compatible with the scintillator material.

15. The scintillator package according to claim 14, wherein the highly reflective metal foil comprises Ag or AI, or both.

16. The scintillator package according to claim 1, wherein the packaging material is subjected to a pre-treatment while in package form, said treatment comprising placing the packaging material under pressure in a confined space until the packaging material is in final form.

17. The scintillator package according to claim 16, wherein the packaging material comprises a reflecting material.

18. The scintillator package according to claim 16, wherein the reflecting material comprises an elastomer.

19. The scintillator package according to claim 16, wherein the reflecting material comprises a reflecting fluorocarbon polymer.

20. The scintillator package according to claim 16, wherein the reflecting material comprises polymer or elastomer loaded with a reflecting inorganic powder.

21. The scintillator package according to claim 20, wherein the high reflectance powder comprises Ab03, TiO2, BN, MgO, BaSO4 or any mixture thereof.

22. The scintillator package according to claim 16, wherein the reflecting inorganic powder comprises a high reflectance oxide.

23. A method for pre-treating packaging materials for use in conjunction with a scintillation crystal, comprising:
subjecting a scintillator packaging material to a pre-treatment while in package form before the scintillation crystal has been installed in the packaging materials, thereby avoiding forming a detrimental structure due to an interaction between the scintillation crystal and the packaging materials while the packaging materials are subject to the treatment, the treatment comprising:
heating the scintillator packaging material to a temperature exceeding a proposed operating temperature of the scintillator package before the scintillation crystal has been installed in the packaging materials; or
placing the packaging material under pressure in a confined space until the packaging material is in final form before the scintillation crystal has been installed in the packaging materials; or
a combination thereof.

24. The method according to claim 23, comprising subjecting the scintillator packaging material to the pre-treatment in an inert atmosphere.

25. The method according to claim 23, wherein said treatment comprises first heating the scintillator packaging material to a temperature exceeding a proposed operating temperature of the scintillator package, and subsequently placing the packaging material under pressure in a confined space until the packaging material is in final form.

26. The method according to claim 23, comprising applying the pre-treatment to the packaging material while the packaging material is disposed on a core having substantially the same shape and size as the scintillator crystal.

27. The method according to claim 26, wherein the core comprises at least one rough surface that enhances the roughness of the packaging material during treatment to ensure a diffuse reflectivity of at least a pre-determined threshold.

28. The method according to claim 23, comprising installing the scintillation crystal into the packaging materials to form a packaged scintillator device and coupling the scintillator device directly to an interface of a photodetection device.

29. The method of claim 28, wherein the scintillator and the interface to the photodetection device are inside a common hermetically sealed housing.

30. The method of claim 28, wherein the packaged scintillator device has a window that forms the interface with the photodetection device.

31. The method according to claim 23, comprising coupling the scintillator directly to an interface of the photodetection device, in the absence of a separately hermetically sealed scintillator package.

\* \* \* \* \*